US010994641B2

(12) United States Patent
Kang (10) Patent No.: US 10,994,641 B2
(45) Date of Patent: May 4, 2021

(54) POSITIONING DEVICE FOR VEHICULAR SEAT (71) Applicant: HYUNDAI IND. CO., LTD., Ulsan (KR)

(72) Inventor: Hyun Suk Kang, Ulsan (KR)

(73) Assignee: HYUNDAI IND. CO., LTD., Ulsan (KR)

( * ) Notice: Subject to any disclaimer, the term of this patent is extended or adjusted under 35 U.S.C. 154(b) by 0 days.

(21) Appl. No.: 16/735,350

(22) Filed: Jan. 6, 2020

(65) Prior Publication Data
US 2020/0247294 A1 Aug. 6, 2020

(30) Foreign Application Priority Data
Feb. 1, 2019 (KR) .................. 10-2019-0013223

(51) Int. Cl.
*B60N 2/865* (2018.01)
*B60N 2/853* (2018.01)
*B60N 2/868* (2018.01)

(52) U.S. Cl.
CPC ............. *B60N 2/853* (2018.02); *B60N 2/865* (2018.02); *B60N 2/868* (2018.02)

(58) Field of Classification Search
CPC ......... B60N 2/853; B60N 2/865; B60N 2/868
See application file for complete search history.

(56) References Cited

FOREIGN PATENT DOCUMENTS

| JP | 2010233648 A | 10/2010 |
|----|----|----|
| KR | 20-19980028432 U | 8/1998 |
| KR | 10-19990038576 A | 6/1999 |
| KR | 10-2008-0084553 A | 9/2008 |
| KR | 10-2010-0130001 A | 12/2010 |
| KR | 101108273 B1 | 1/2012 |

*Primary Examiner* — Philip F Gabler
(74) *Attorney, Agent, or Firm* — Nelson Mullins Riley & Scarborough LLP; Kongsik Kim, Esq.

(57) ABSTRACT

Disclosed is a positioning device for a vehicular seat that is configured to enable a driver or occupant to adjust a position of a headrest according to a body type or posture, so that the driver can drive a vehicle in a comfortable position, as well as minimizing an injury to cervical vertebrae in a car accident.

2 Claims, 8 Drawing Sheets

POSITIONING DEVICE FOR VEHICULAR SEAT

CROSS REFERENCE TO RELATED APPLICATION

This application claims priority from Korean Patent Application No. 10-2019-0013223, filed on Feb. 1, 2019, which is hereby incorporated by reference.

TECHNICAL FIELD

The present invention relates to a positioning device for a vehicular seat that is configured to enable a driver or occupant to adjust a position of a headrest according to a body type or posture, so that the driver can drive a vehicle in a comfortable position, as well as minimizing an injury to cervical vertebrae in a car accident.

RELATED ART

Head restraints or headrests are attached or integrated into tops of vehicular seats, and are configured in such a way that the height of the headrest can be adjusted. The headrest supports an occipital region of the driver or occupant seating on the vehicular seat to provide comfortable impression of riding, and limits rearward movement of the occupant's head, relative to a torso, in a collision, thereby preventing injury to the cervical vertebrae.

According to the headrest of the related art, for example, disclosed in Korean Patent No. 1108273, the headrest is connected to a backrest of the seat by a stay, and the stay is moved up and down to adjust the height of the headrest according to a body type of the driver or occupant.

In the case where the seat is pushed backward and then the driver drives the vehicle in a state of leaning back, or the driver leans forward in driving, an occipital region of the driver is too far away from the headrest, and thus the headrest does not sufficiently support the occipital region. Therefore, there is a problem in that the driver or occupant becomes more and more fatigued, and the head moved rearward, relative to a torso, in a collision, which results in the injury to cervical vertebrae.

SUMMARY

Therefore, the present invention has been made in view of the above problem, and one object of the invention is to provide a positioning device for a headrest of a vehicular seat, in which a position of the headrest is moved back and forth according to a body type or posture of a driver or occupant to support an occipital region of the driver or occupant, thereby providing the driver or occupant with comfortable impression of riding to reduce operation fatigue, and minimizing injury to cervical vertebrae in a collision.

According to one aspect of the present invention, there is provided a positioning device for a headrest of a vehicular seat, of which the headrest is moved in a forward or rearward direction by a movable member, wherein a lower housing is formed in a shape of a rectangular box, of which top and right sides are opened, and includes a pusher, a left slider and a right slider in an inner space; a top surface of the pusher is provided with a pushing protrusion which abuts against a right end of the left slider, and a right end of the pusher is provided with a pressing member protruding toward the right side of the lower housing to press the pusher in a leftward direction; a left top surface of the left slider is provided with a locking column having a locking groove which receives a locking protrusion formed on a left side of the movable member, and a right side of the left slider which is overlapped with the right slider is provided with a rotating shaft hole for receiving a rotating shaft of a rotary plate which is interposed between the left slider and the right slider, and a lower elongated hole for receiving a lower protrusion of the rotating shaft so that the rotary plate rotates according to left and right movement of the left slider; a right top surface of the right slider is provided with a locking column having a locking groove which receives a locking protrusion formed on a right side of the movable member, and a left side of the right slider which is overlapped with the left slider is provided with an upper elongated hole for receiving an upper protrusion of the rotary plate; the rotating shaft formed at a center of a bottom surface of the rotary plate is fitted into the rotating shaft hole of the left slider, the lower protrusion formed at a front portion of the bottom surface is fitted into the lower elongated hole of the left slider, and the upper protrusion formed at a rear portion of the top surface is fitted into the upper elongated hole of the right slider; springs are installed to the left side of the left slider and the right side of the right slider, respectively; the upper housing includes a channel, in which the movable member is inserted in the channel to move along the channel in forward and rearward directions, and a cover at a lower end of the upper housing to cover the lower housing and be coupled to the lower housing; left and right sides of the movable member are provided with a plurality of locking protrusions which are locked to the locking grooves of the locking columns provided to the left slider and the right slider; and if the pressing member is pressed, the left slider and the right slider come away from each other, and the locking groove is unlocked from the locking protrusion, so that the movable member moves back and forth, while the pressed state of the pressing member is released, the left slider and the right slider come close to each other, and the locking groove is locked to the locking protrusion, so that the movable member is fixed.

In addition, a leaf spring is disposed at an upper center of the channel of the upper housing, and has a bent locking portion at a distal end thereof. The respective positions of locking grooves which are a center of the top surface of the upper housing corresponds to a position when each locking groove of the locking column receives each locking protrusion of the movable member, and the locking groove is locked by the bent locking portion of the leaf spring at the position. When the movable member moves back and forth, the bent locking portion of the leaf spring is inserted and locked to the locking groove to produce click sound and vibration.

With the above configuration of the invention, the positioning device can adjust the front and rear position of the headrest by simple operation according to the body type or posture of the driver or occupant, thereby providing the driver or occupant with comfortable impression of riding to reduce operation fatigue and minimizing injury to cervical vertebrae in a collision.

BRIEF DESCRIPTION OF THE DRAWINGS

Reference is now made briefly to the accompanying drawings, in which.

Repeat use of reference characters throughout the present invention and appended drawings is intended to represent the same or analogous features or elements of the invention.

DETAILED DESCRIPTION

The detailed configuration of the invention will be hereafter described with reference to the accompanying drawings.

FIGS. 1 to 4 show the major configuration of a positioning device for a headrest of a vehicular seat according to one embodiment of the invention. As illustrated in the drawings, the headrest of the invention includes an upper housing 11 and a lower housing 21 which serve as a frame. A stay 12 is fixed to the upper housing 11, and both ends of the stay 12 go through housing penetration holes 22 formed in the lower housing 21, and then are coupled to a backrest (not illustrated) of the seat. The upper housing 11 and the lower housing 21 are enclosed by a cushion member 80 for supporting an occipital region of a driver or occupant.

First of all, the structure of the lower housing 21 will be described. The lower housing 21 is formed in the shape of a rectangular box, of which top and right sides are opened, and is provided at right and left sides thereof with the housing penetration holes 22, through which the stay 12 goes. The lower housing 21 includes a pusher 31, a left slider 41 and a right slider 61 in an inner space. A rotary plate 51 is disposed between the left slider 41 and the right slider 61, and a cover 16 formed below the upper housing 11 covers the opened upper portion of the lower housing 21 to couple the upper housing 11 and the lower housing 21.

The pusher 31 is formed in the shape of a flat bar to move in left and right directions within the lower housing 21, and is provided at left and right sides thereof with elongated through-holes 33 so that the pusher 31 can move in the left and right directions in the state in which the stay 12 passes through. A top surface of the pusher 31 is provided with a pushing protrusion 32 which abuts against a right end of the left slider 41, and a right end of the pusher 31 is provided with a pressing member 34 protruding toward the right side of the lower housing 21. If the pressing member 34 is pushed in a leftward direction, the pusher 31 is moved in the leftward direction, and thus the left slider 41 abutting against the pushing protrusion 32 is moved in the leftward direction.

The left slider 41 and the right slider 61 are disposed on the pusher 31, and are housed by the lower housing 21. The left slider 41 is formed in the shape of a rectangular box, of which the top and right sides are opened. A portion of the left slider 41 is inserted in the right slider 61. In order to dispose the rotary plate 51 in the space between the left slider 41 and the right slider 61, a right flange of the left slider 41 is higher and narrower than a left flange. Therefore, the left slider 41 and the right slider 61 can come close to each other or away from each other in the state in which the right portion of the left slider 41 is partially overlapped with the left side of the right slider 61.

The left top surface of the left slider 41 is provided with a locking column 44 having a locking groove 45 which receives a locking protrusion 72 formed on the left side of the movable member 71. The right side of the left slider 41 which is overlapped with the right slider 61 is provided with a rotating shaft hole 42 for receiving a rotating shaft 52 of the rotary plate 51 which is interposed between the left slider 41 and the right slider 61, and a lower elongated hole 43 for receiving a lower protrusion 53 of the rotating shaft 52 so that the rotary plate 51 rotates according to the left and right movement of the left slider 41.

The right slider 61 is formed in the shape of a rectangular box, of which the bottom and left sides are opened. The right top surface of the right slider 61 is provided with a locking column 44 having a locking groove 45 which receives a locking protrusion 72 formed on the right side of the movable member 71. The left side of the right slider 61 which is overlapped with the left slider 41 is provided with an upper elongated hole 63 for receiving an upper protrusion 54 of the rotary plate 51 which is interposed between the left slider 41 and the right slider 61, so that the right slider 61 moves in the rightward direction by rotation of the rotary plate 51.

Springs 46 are installed to the left side of the left slider 41 and the right side of the right slider 61 to resiliently support the left slider 41 and the right slider 61 so that the left slider 41 and the right slider 61 come close to each other.

The rotary plate 51 is disposed in the overlapped space formed by the left slider 41 and the right slider 61. The left slider 41 and the right slider 61 come close to each other or away from each other by left and right movement of the left slider 41. The rotating shaft 52 formed at the center of the bottom surface of the rotary plate 51 is fitted into the rotating shaft hole 42 of the left slider 41, of which the lower protrusion 53 formed at the front portion of the bottom surface is fitted into the lower elongated hole 43 of the left slider 41, and the upper protrusion 54 formed at the rear portion of the top surface is fitted into the upper elongated hole 63 of the right slider 61.

The upper housing 11 includes a channel 13 penetrating the upper housing in a longitudinal direction, the movable member 71 inserted in the channel 13 and moving along the channel in forward and rearward directions, and the cover 16 covering the lower housing 21 to be coupled to the lower housing 21. The left and right sides of the movable member 71 are provided with the plurality of locking protrusions 72 which are locked to the locking grooves 45 of the locking columns 44 provided to the left slider 41 and the right slider 61.

The leaf spring 14 is disposed at the upper center of the channel 13 of the upper housing 11, and has a bent locking portion 15 at a distal end of the leaf spring 14. When the movable member 71 moves back and forth, the bent locking portion 15 is sequentially locked to or unlocked from the locking grooves 73 of the movable member 71.

The movable member 71 of a dumbbell shape is fixed to the channel 13 or moves back and forth in the channel 13. Left and right sides of the movable member 71 are provided with the plurality of locking protrusions 72 formed at regular intervals which are locked to the locking grooves 45, and a top surface of the movable member 71 is provided with a plurality of locking grooves formed at regular intervals, the number and interval of the locking grooves being equal to those of the locking protrusions 72.

When the left slider 41 and the right slider 61 come close to each other, the locking groove 45 of the locking column 44 receives the locking protrusion 72, so that the position of the movable member 71 is locked. When the left slider 41 and the right slider 61 come away from each other, the locking groove 45 of the locking column 44 is released from the locking protrusion 72, so that the position of the movable member 71 is unlocked and thus the movable member is able to move back and forth.

The locking grooves 73 are formed in the curved shape on the center of the top surface of the upper housing 11. The respective positions of the locking grooves 73 corresponds to the position when each locking groove 45 of the locking column 44 receives each locking protrusion 72 of the movable member 71, and is locked by the bent locking portion 15 of the leaf spring 14 at the position.

Figure 5:
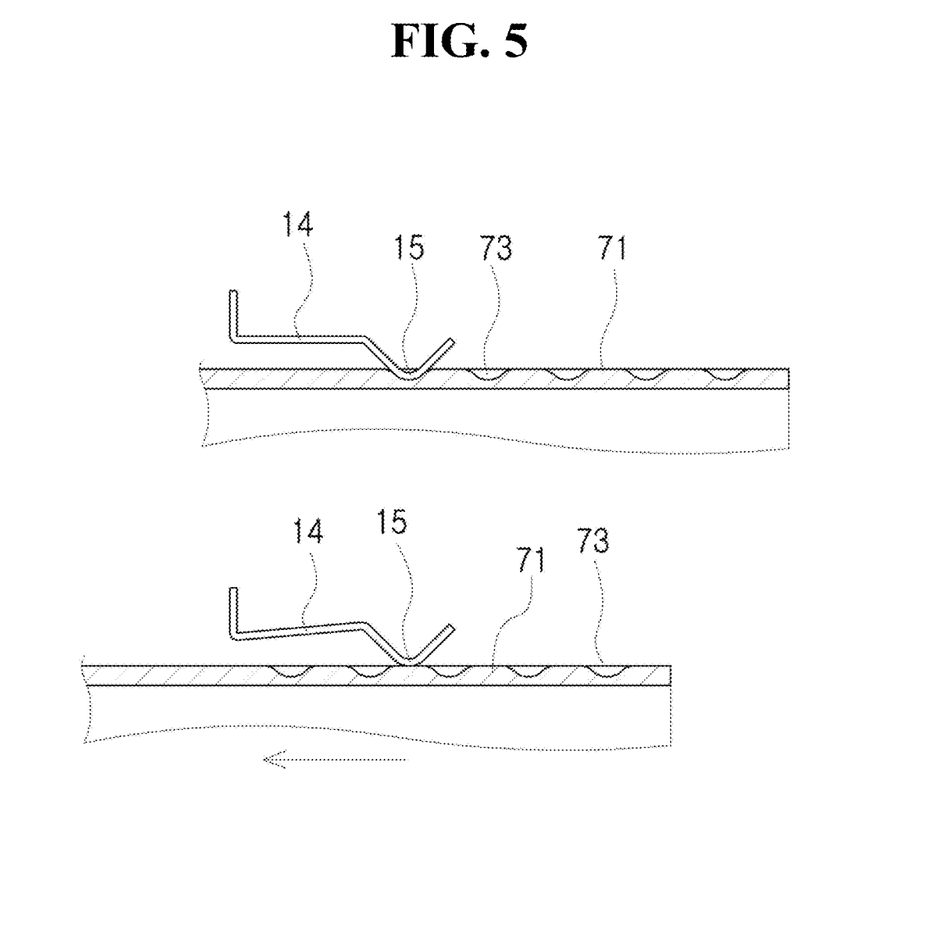
FIG. 5 is a cross-sectional view illustrating a state in which a leaf spring is locked or unlocked to or from a locking groove as a movable member of the invention is moving.

As illustrated in FIG. 5, when the movable member 71 moves back and forth, the bent locking portion 15 of the leaf spring 14 is repeatedly locked and unlocked to or from the locking grooves 73. When the bent locking portion 15 of the leaf spring 14 is inserted and locked to the locking grooves 73, the resilient force of the leaf spring 14 generates click sound and vibration. Also, since the position of the movable member 71 is temporarily fixed, the driver or occupant can know the moving state of the headrest based on the sound and vibration, so that the locking protrusions 72 can be locked to the locking grooves 45 at a correct position.

The configuration according to this embodiment will now be described with reference to FIGS. 6A and 6B.

Figure 6A:
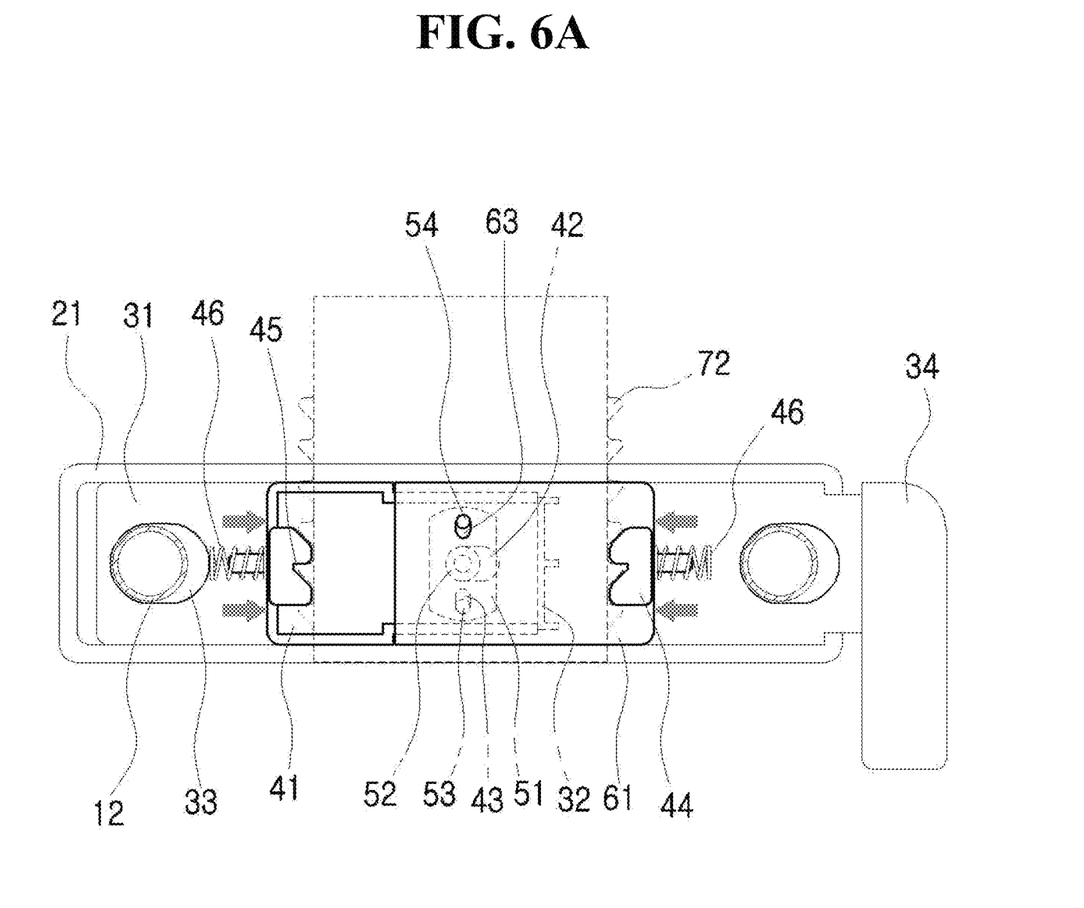
FIGS. 6A and 6B are plan views illustrating a state in which the movable member of the invention moves back and forth.

FIG. 6A shows the state in which the movable member 71 of the invention is fixed. The left slider 41 and the right slider 61 comes close to each other by the resilience of the springs 46, and thus the locking groove 45 of the locking column 44 receives the locking protrusion 72 of the movable member 71, so that the movable member 71 is fixed to stably support the occipital region of the driver or occupant.

Figure 6B:
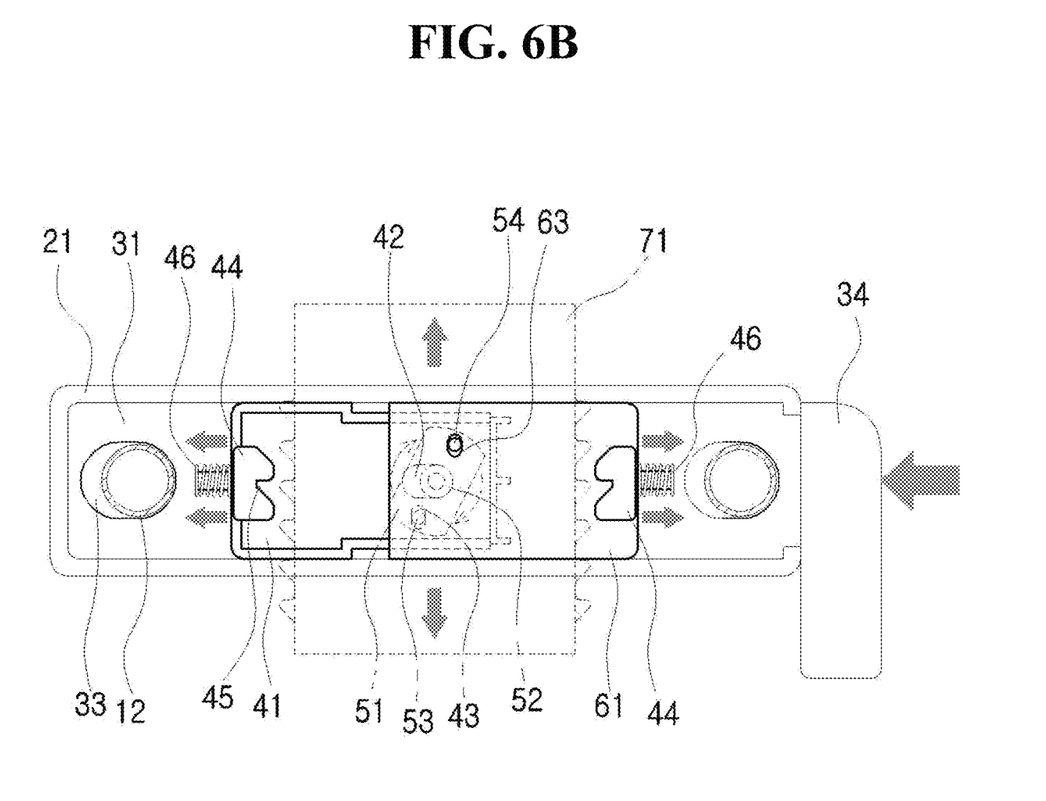

FIG. 6B shows the state in which the movable member 71 is moved. When the pusher 31 is pushed in the leftward direction by pressing the pressing member 34, the left slider 41 abutting against the right end of the pushing protrusion 32 of the pusher 31 moves together with the pusher 31 in the leftward direction against the resilience of the spring 46. In this instance, the lower protrusion 53 fitted into the lower elongated hole 43 of the left slider 41 is rotated in a clockwise direction, and the rotary plate 51 is rotated in the rightward direction around the rotating shaft hole 42. As the rotary plate 51 rotates, the upper protrusion 54 fitted into the upper elongated hole 63 of the right slider 61 is rotated in the clockwise direction to push the right slider 61 in the rightward direction against the resilience of the spring 46.

If the left slider 41 and the right slider 61 come away from each other, the locking groove 45 of the locking column 44 is released from the locking protrusion 72 to unlock the movable member 71, so that the movable member 71 can move back and forth. When the movable member 71 moves, the bent locking portion 15 is sequentially locked or unlocked to or from the locking grooves 73 of the movable member 71 to generate the click sound and vibration. Also, since the position of the movable member 71 is temporarily fixed, the driver or occupant can know the moving state of the movable member 71 step by step.

If the pressed state of the pressing member 34 is released after the movable member 71 moves to a proper position, the left slider 41 and the right slider 61 come close to each other by the resilience of the springs 46, and the locking groove 45 of the locking column 44 receives the locking protrusion 72 of the movable member 71 to fix the movable member 71. At the same time, the lower protrusion 53 fitted into the lower elongated hole 43 of the left slider 41 is rotated in a counterclockwise direction, and the upper protrusion 54 fitted into the upper elongated hole 63 of the right slider 61 is rotated in the counterclockwise direction. The rotary plate 51 moves to its original position, that is, the right side, and is rotated in the counterclockwise direction. And then, the pusher 31 moves to its original position, that is, the right side, by the pushing protrusion 32 abutting against the right side of the left slider 41.

Figure 1:
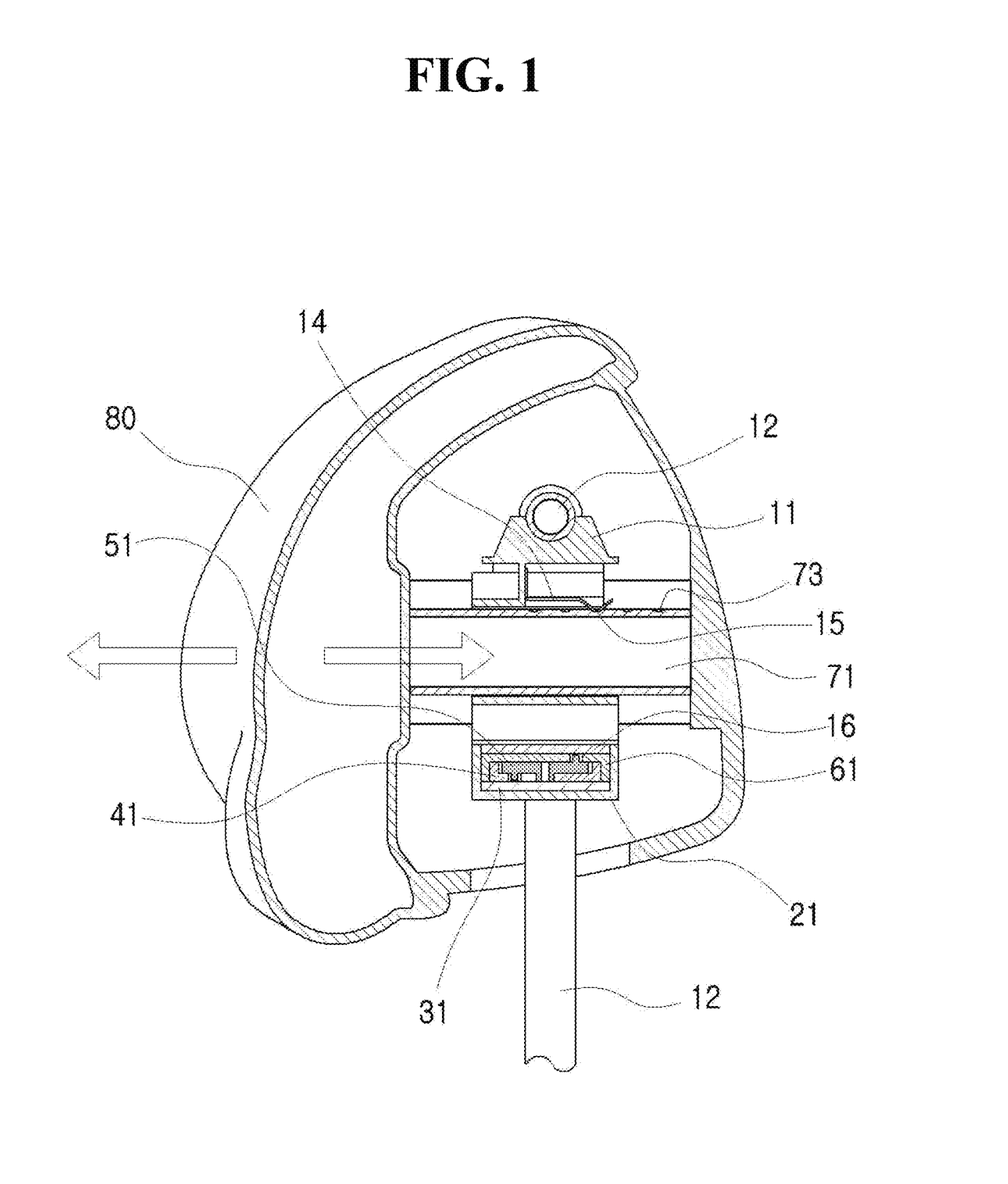
FIG. 1 is a cross-sectional view illustrating a positioning device for a headrest according to one embodiment of the invention.
Figure 2:
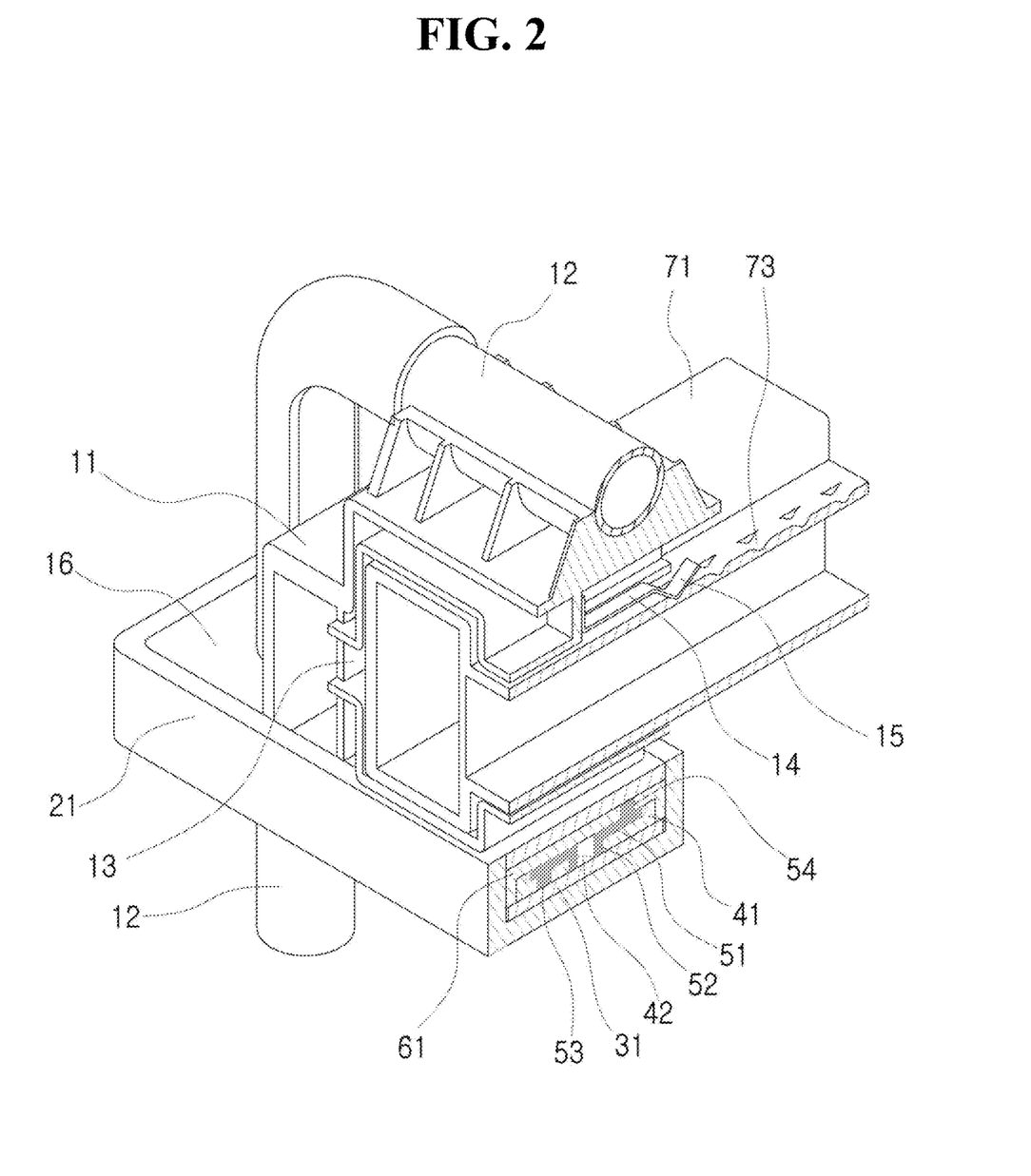
FIG. 2 is a partially cross-sectional view illustrating major components of the positioning device for the headrest according to one embodiment of the invention.
Figure 3:
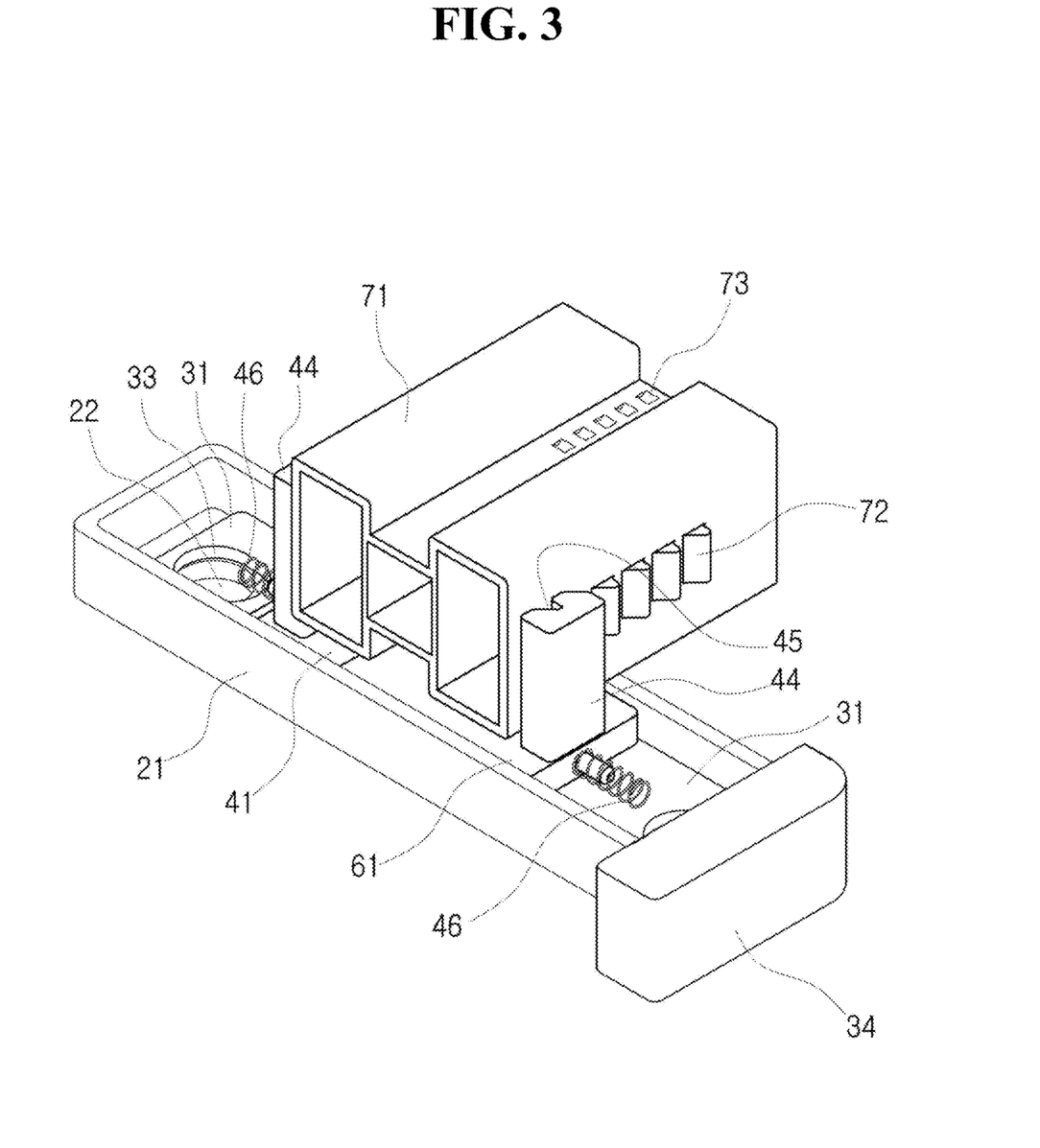
FIG. 3 is a perspective view illustrating the major components of the positioning device for the headrest according to one embodiment of the invention.
Figure 4:
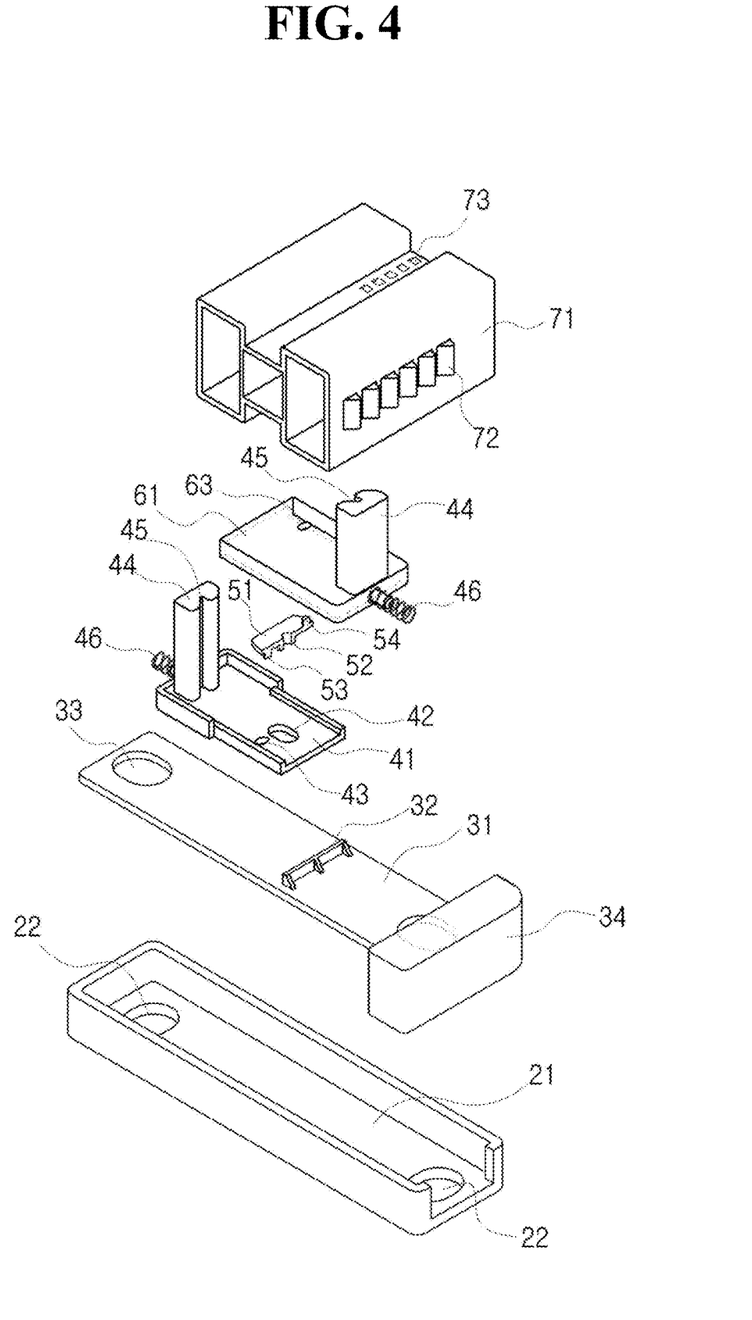
FIG. 4 is an exploded perspective view illustrating the major components in FIG. 3.
Figure 7:
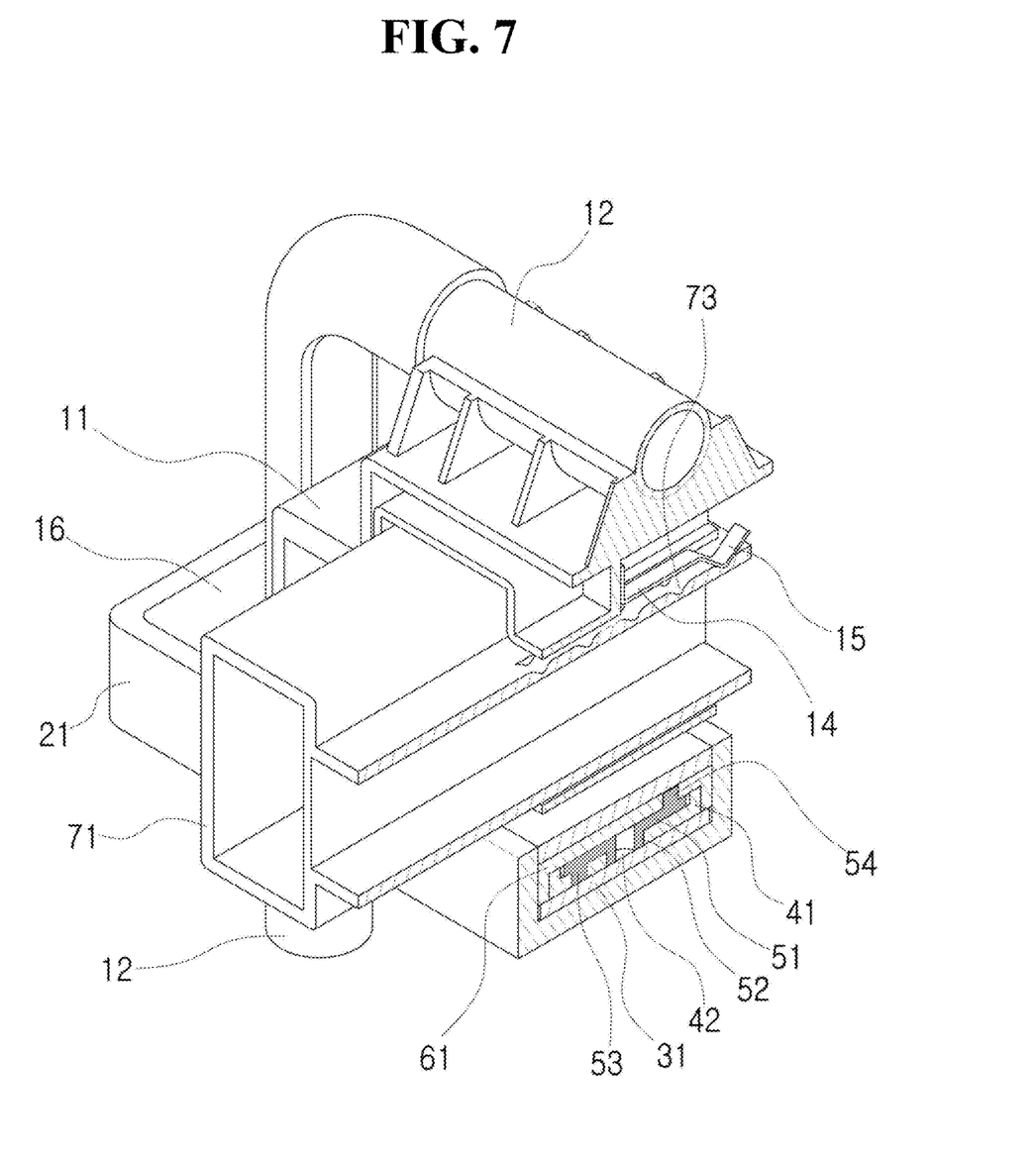
FIG. 7 is a partially cross-sectional view illustrating a state in which the movable member in FIG. 2 moves forth.

According to the invention, the fixation of the movable member 71 is released only by pressing the pressing member 34, while the movable member 71 is fixed by releasing the pressed state of the pressing member 34. As illustrated in FIG. 2, the headrest can be positioned at the rear side, while as illustrated in FIG. 7, the headrest can be positioned at the front side, thereby easily and quickly adjusting the position of the headrest.

In particular, the locking protrusions 72 formed on the movable member 71 of the invention are formed in the shape of a right-angled triangle, when seen from a cross section, in such a way that an inclined surface is formed toward the front side, and a wall perpendicular to a moving direction of the movable member 71 is formed toward the rear side. Therefore, in the state in which the locking protrusion 72 is locked to the locking groove 45 of the locking column 44, the rearward movement of the movable member 71 is limited, but the forward movement of the movable member 71 is allowed.

In a head-on collision, the movable member 71 is automatically moved in the forward direction by inertia to protect the injury of the driver or occupant. Therefore, the invention can prevent the injury in the head-on collision, in addition to the injury in the rear-end collision which is the major function of the headrest for the vehicular seat.

Specifically, in the head-on collision, the body of the driver or occupant abruptly leans in the forward direction due to the inertia, and then the body abruptly returns to the rear due to the self-resilience and the repulsive power generated by collision. The headrest of the related art cannot protect the abrupt deformation of the cervical vertebrae at the return, which results in the serious injury. However, as the upper body of the driver or occupant returns in the state in which the headrest is automatically moved in the forward direction, as well as the cushion member 80 connected to the movable member 71, the invention can minimize the deformation of the body which is caused by the return, thereby preventing the serious injury.

The headrest including the positioning device of the invention can obtain the superior effect of preventing the injury, relative to the related art, even in the rear-end collision, in addition to the effect of preventing the injury of the driver or occupant in the head-on collision. The reason is that the movable member 71 relatively freely moves in the forward direction. The rearward movement of the head and the cervical vertebrae of the driver or occupant is suppressed by the headrest and the cushion member 80 in the rear-end collision. In the state in which a vehicular body abruptly moves in the forward direction due to the collision impact, the body of the driver or occupant acts like the behavior occurring in the head-on collision. When the vehicular body moves forwardly and then stops, the headrest and the movable member 71 move forwardly due to the inertia to certainly support the head and the cervical vertebrae of the driver or occupant.

While the present invention has been described with reference to the particular illustrative embodiment, it is not to be restricted by the embodiments but only by the appended claims. It is to be appreciated that those skilled in the art can change or modify the embodiments without departing from the scope and spirit of the present invention.

What is claimed is:

1. A positioning device for a headrest of a vehicular seat, of which the headrest is moved in a forward or rearward direction by a movable member (71), wherein
   a lower housing (21) is formed in a shape of a rectangular box, of which top and right sides are opened, and includes a pusher (31), a left slider (41) and a right slider (61) in an inner space;
   a top surface of the pusher (31) is provided with a pushing protrusion (32) which abuts against a right end of the left slider (41), and a right end of the pusher (31) is provided with a pressing member (34) protruding toward the right side of the lower housing (21) to press the pusher (31) in a leftward direction;
   a left top surface of the left slider (41) is provided with a locking column (44) having a locking groove (45) which receives a locking protrusion (72) of a plurality of locking protrusions formed on a left side of the movable member (71), and a right side of the left slider (41) which is overlapped with the right slider (61) is provided with a rotating shaft hole (42) for receiving a rotating shaft (52) of a rotary plate (51) which is interposed between the left slider (41) and the right slider (61), and a lower elongated hole (43) for receiving a lower protrusion (53) of the rotating shaft (52) so that the rotary plate (51) rotates according to left and right movement of the left slider (41);
   a right top surface of the right slider (61) is provided with a locking column (44) having a locking groove (45) which receives a locking protrusion (72) of a plurality of locking protrusions formed on a right side of the movable member (71), and a left side of the right slider (61) which is overlapped with the left slider (41) is provided with an upper elongated hole (63) for receiving an upper protrusion (54) of the rotary plate (51);
   the rotating shaft (52) formed at a center of a bottom surface of the rotary plate (51) is fitted into the rotating shaft hole (42) of the left slider (41), the lower protrusion (53) formed at a front portion of the bottom surface is fitted into the lower elongated hole (43) of the left slider (41), and the upper protrusion (54) formed at a rear portion of the top surface is fitted into the upper elongated hole (63) of the right slider (61);
   springs (46) are installed to the left side of the left slider (41) and the right side of the right slider (61), respectively;
   the upper housing (11) includes a channel (13), in which the movable member (71) is inserted in the channel (13) to move along the channel in forward and rearward directions, and a cover (16) at a lower end of the upper housing to cover the lower housing (21) and be coupled to the lower housing (21);
   left and right sides of the movable member (71) are each provided with the pluralities of locking protrusions (72) which are locked to the locking grooves (45) of the locking columns (44) provided to the left slider (41) and the right slider (61); and
   in response to the pressing member (34) being pressed, the left slider (41) and the right slider (61) come away from each other, and respective locking grooves (45) are unlocked from respective locking protrusions (72), so that the movable member (71) moves back and forth, and in response to the pressed state of the pressing member (34) being released, the left slider (41) and the right slider (61) come closer to each other, and respective locking grooves (45) are locked to respective locking protrusions (72), so that the movable member (71) is fixed.

2. The positioning device for the headrest of the vehicular seat according to claim 1, wherein a leaf spring (14) is disposed at an upper center of the channel (13) of the upper housing (11), and has a bent locking portion (15) at a distal end thereof;
   respective positions of upper locking grooves (73) each correspond to positions when each locking groove (45) of the locking column (44) receives each locking protrusion (72) of the movable member (71), and the respective upper locking groove (73) is locked by the bent locking portion (15) of the leaf spring (14) at the position; and
   when the movable member (71) moves back and forth, the bent locking portion (15) of the leaf spring (14) is inserted and locked to the locking groove (73) to produce click sound and vibration.

* * * * *